US007627808B2

(12) United States Patent
Blank et al.

(10) Patent No.: US 7,627,808 B2
(45) Date of Patent: Dec. 1, 2009

(54) COMPUTER MEDIA SYNCHRONIZATION PLAYER

(75) Inventors: William Thomas Blank, Bellevue, WA (US); John B. Deutscher, Sammamish, WA (US); Brian D. Honey, Auburn, WA (US); Tyler V. Davis, Issaquah, WA (US); John Conrad, Auburn, WA (US); Andrew D. Rosen, Woodinville, WA (US); Sunit Gogia, New Delhi (IN)

(73) Assignee: Microsoft Corporation, Redmond, WA (US)

( * ) Notice: Subject to any disclaimer, the term of this patent is extended or adjusted under 35 U.S.C. 154(b) by 1060 days.

(21) Appl. No.: 10/461,222

(22) Filed: Jun. 13, 2003

(65) Prior Publication Data

US 2004/0252400 A1 Dec. 16, 2004

(51) Int. Cl.
*G06F 17/00* (2006.01)

(52) U.S. Cl. ........................ 715/200; 715/716; 709/208; 709/248

(58) Field of Classification Search ................. 715/500, 715/500.1, 513, 200, 205, 234, 723, 716; 725/63; 709/204, 205, 208, 219, 224, 248; 386/46; 345/723; 348/E7.069; 370/503
See application file for complete search history.

(56) References Cited

U.S. PATENT DOCUMENTS 5,109,484 A * 4/1992 Hughes et al. .............. 709/222
5,452,435 A * 9/1995 Malouf et al. ............... 713/500
5,523,852 A * 6/1996 Sowerby et al. ............... 386/66
5,602,596 A * 2/1997 Claussen et al. .............. 725/37
5,680,639 A * 10/1997 Milne et al. .............. 715/500.1
5,761,434 A * 6/1998 Hewitt ........................ 709/231
5,801,754 A * 9/1998 Ruybal et al. ................. 725/65
6,137,943 A * 10/2000 Kanda ......................... 386/46
6,161,132 A * 12/2000 Roberts et al. .............. 709/219
6,611,537 B1 * 8/2003 Edens et al. ................ 370/503
7,082,398 B1 * 7/2006 Apple et al. .................... 705/1
7,114,172 B2 * 9/2006 Lord ........................... 725/80
7,391,791 B2 * 6/2008 Balassanian et al. ........ 370/503
2002/0109710 A1 * 8/2002 Holtz et al. ................. 345/723
2002/0116539 A1 * 8/2002 Bryczkowski et al. ....... 709/317
2002/0174243 A1 * 11/2002 Spurgat et al. .............. 709/231
2003/0097478 A1 * 5/2003 King .......................... 709/248
2003/0126211 A1 * 7/2003 Anttila et al. ............... 709/205
2003/0204850 A1 * 10/2003 Ng et al. ........................ 725/63
2006/0002681 A1 * 1/2006 Spilo et al. .................... 386/46

* cited by examiner

*Primary Examiner*—Doug Hutton
*Assistant Examiner*—James H Blackwell
(74) *Attorney, Agent, or Firm*—Lee & Hayes, PLLC

(57) ABSTRACT

A media synch player includes a time control module, a digital data storage and retrieval device coupled to and responsive to the time control module and an audiovisual data signal output configured to supply audiovisual data to a display by playing a first media file from the digital data storage and retrieval device in response to commands from a system controller. The time control module is configured to request a system time from an external time server, reset the time control module in accordance with the system time, lock to a master clock contained in the external time server and resynchronize the first time control module in response to predetermined criteria being met.

31 Claims, 7 Drawing Sheets

| | Player | File Name | Start | File Duration | TRT | Bg Image | Bg Color | Freeze |
|---|---|---|---|---|---|---|---|---|
| 1 | A1 | Fgn_Affair ▽ | 00:00 | 00:05:00 | 05:00 | ▽ | | ☐☐ |
| 2 | B1 | Fgn_Affair ▽ | 00:00 | 00:05:00 | 05:00 | ▽ | Black | ☐☐ |
| 3 | C1 | Fgn_Affair ▽ | 00:00 | 00:05:00 | 05:00 | ▽ | Black | ☐☐ |

Event Details — 600; 605, 610, 615, 620, 630

Player Setup — 700; 705, 710, 715, 720, 730

| | ID | IP Address | Machine | Friendly Name | Backup ID | X | Y | Width | Height |
|---|---|---|---|---|---|---|---|---|---|
| | 1 | 172.31.161.138 | A1 | A1 | 4 | 0 | 0 | 1024 | 768 |
| | 2 | 172.31.161.10 | B1 | B1 | 5 | 0 | 0 | 1024 | 768 |
| | 3 | 172.31.161.132 | C1 | C1 | 6 | 0 | 0 | 1024 | 768 |
| | 4 | 172.31.161.131 | A2 | A2 | | 0 | 0 | 1024 | 768 |
| | 5 | 172.31.161.135 | B2 | B2 | | 0 | 0 | 1024 | 768 |
| | 6 | 172.31.161.136 | C2 | C2 | | 0 | 0 | 1024 | 768 |

| | Player | File Time | File Remaining | TRT | TRT Remaining | Finish Time |
|---|---|---|---|---|---|---|
| | A1 | 00:00:08 | 00:04:52 | 00:05:00 | **00:04:52** | 00:05:00 |
| | B1 | 00:00:08 | 00:04:52 | 00:05:00 | **00:04:52** | 00:05:00 |
| | C1 | 00:00:08 | 00:04:52 | 00:05:00 | **00:04:52** | 00:05:00 |

Timers — 800
805 — (column marker)
810 — (column marker)
815 — (column marker)
820
830

Player Setup / Player Status — 900
905, 910

Test    00:00:00/00:05:00 PLAYING    920    930

- ☐ (Stop)
- ▷ (Play)
- ▷ NEXT
- ❙❙ (Pause)
- STOP SELECTED
- CUE
- CUE NEXT
- PAUSE SELECTED ◉ ABSOLUTE   00:00:00   SEEK & PLAY
○ RELATIVE        COLORS      PATTERNS
HEAD OFFSET  5    ☐    935
                        932
MUTE ALL    MUTE LTC    ← 940

950

COMPUTER MEDIA SYNCHRONIZATION PLAYER

TECHNICAL FIELD

The disclosure relates to synchronization of two or more content providers for image displays.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the graphical user interfaces as described below and in the referenced drawings: Copyright © 2003, Microsoft Corporation.

BACKGROUND

Various types of systems have been employed as signal sources for displays used in different types of audio-visual display settings. For example, movies are typically presented using a film projector by advancing a strip of film through the projector, illuminating a portion of the film and conditioning light transmitted through the film for projection on a screen. In some other types of systems, a pre-recorded video tape recorder or player magnetic tape system is employed as a signal source. In such systems, the term "display" means providing a capability for both audio and video signals. In systems that employ a continuous physical medium as a content storage and/or playback medium, it is difficult to synchronize multiple signal sources to provide a coordinated display of multiple images, some of which may be identical, or multiple different portions or "tiles" of a single image.

Additionally, such systems do not facilitate modification of the presentation "on the fly" and thus can make rehearsals, which frequently require modification of the score (e.g., rewinding for a revision of a given segment), cumbersome. In other words, if need to replay a portion of the presentation presents itself during the presentation or rehearsal, the medium must be physically rewound, a specific portion corresponding to the portion to be replayed must be located, and the display process re-initiated. Similarly, when it is determined that a portion of a pre-recorded display should be skipped, there is need to fast forward the medium, locate a desired portion and restart the display process. Such results in interruption of the presentation, which detracts from the audience appreciation of the content that is being presented.

Additionally, the types of machinery used in such systems, such as video tape recorders and film projectors, tend to be quite expensive. One approach to ensuring uninterrupted operation of an electronic system is to run a primary system in tandem with a backup system that is switched to the role of the primary system when problems develop in the primary system. However, when there is need to provide multiple images for a particular event, the costs associated with providing multiple backup systems become inconvenient. This is especially true when the event is a one-time event, such as an annual meeting, symposium or the like.

When multiple audio-visual displays are employed to try to provide a large audience with access to a particular presentation, such as a speaker addressing a large audience, there is need to maintain synchronization between the images and more particularly between the images and any related sound tracks. When the sound tracks are not synchronized with each other, or when the sound track is not synchronized with the image, the perceptual discordance of the presentation tends to undesirably detract from intelligibility and audience appreciation of the content being presented.

As an example, studies and experiments have yielded a generally-accepted standard of a range of a relative delay of a negative eight milliseconds and a positive twenty to thirty milliseconds of synchronization between sound and visual display to avoid viewer/listener perception of the relative delay and thus to avoid distraction from the content.

Further, large amounts of media having video and audio-visual content have been recorded since the inception of such systems. As such systems developed and realized increasing sophistication, a variety of standards were deployed in order that such recorded media could be distributed over wide geographic areas and used to provide relatively constant quality and intelligibility. For example, a number of such standards have been put forth by the Society of Motion Picture and Television Engineers and these are generally referred to as SMPTE standards. When a presentation relies on an ensemble of disparately-recorded video streams, it is necessary to be able to process data recorded using these various different standards, which, in turn, complicates synchronization of multiple displays.

Accordingly, there are needs for improved techniques, systems and apparatus for providing more robust synchronization of multiple video and/or audio-visual displays or data streams together with improved ability to arbitrarily shift from one point to another in such data streams in synchrony.

SUMMARY

An architecture and methodology for improved synchronization and display of video and/or audio-visual media is described. In one aspect, a media synch player includes a time control module, a digital data storage and retrieval device coupled to and responsive to the time control module and an audiovisual data signal output configured to supply audiovisual data to a display by playing a media file from the digital data storage and retrieval device in response to commands from a system controller. The time control module is configured to request a system time from an external time server, reset the time control module in accordance with the system time, lock to a master clock contained in the external time server and resynchronize the first time control module in response to predetermined criteria being met.

BRIEF DESCRIPTION OF THE CONTENTS

Figure 5:
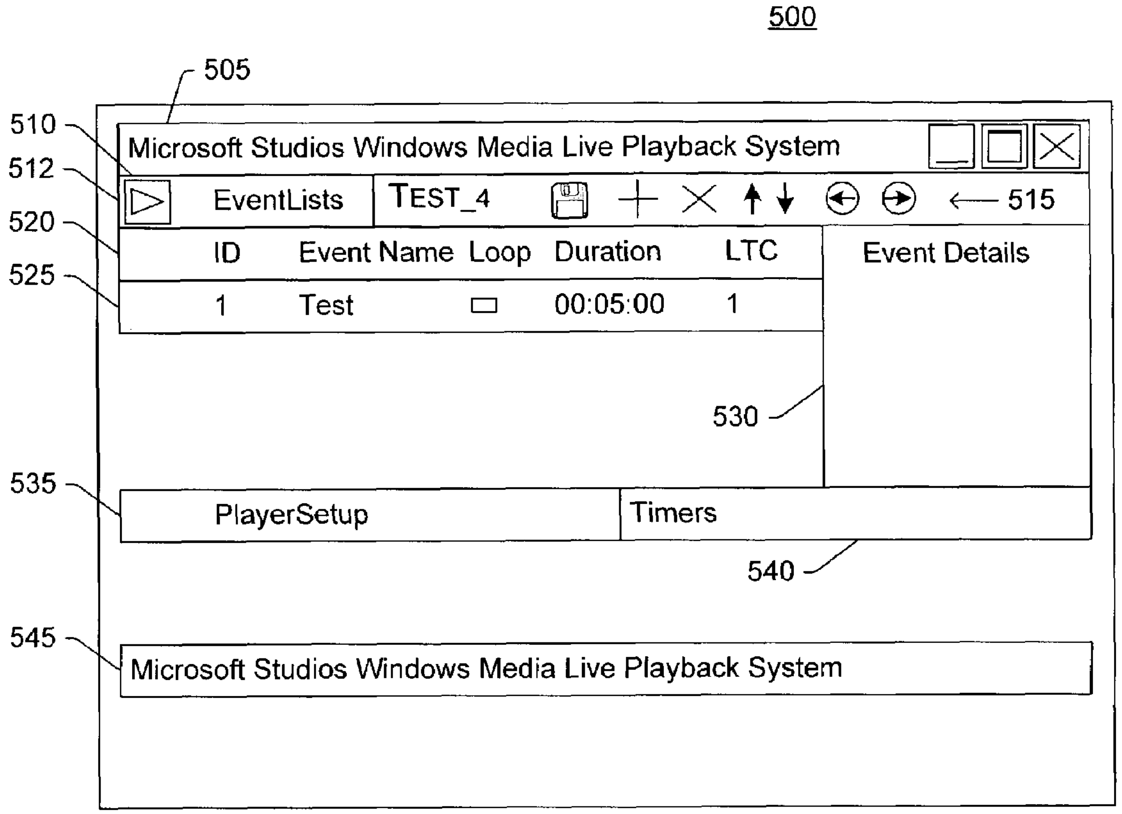
FIG. 5 represents an exemplary graphical user interface associated with the control console of FIG. 1.
Figure 8:
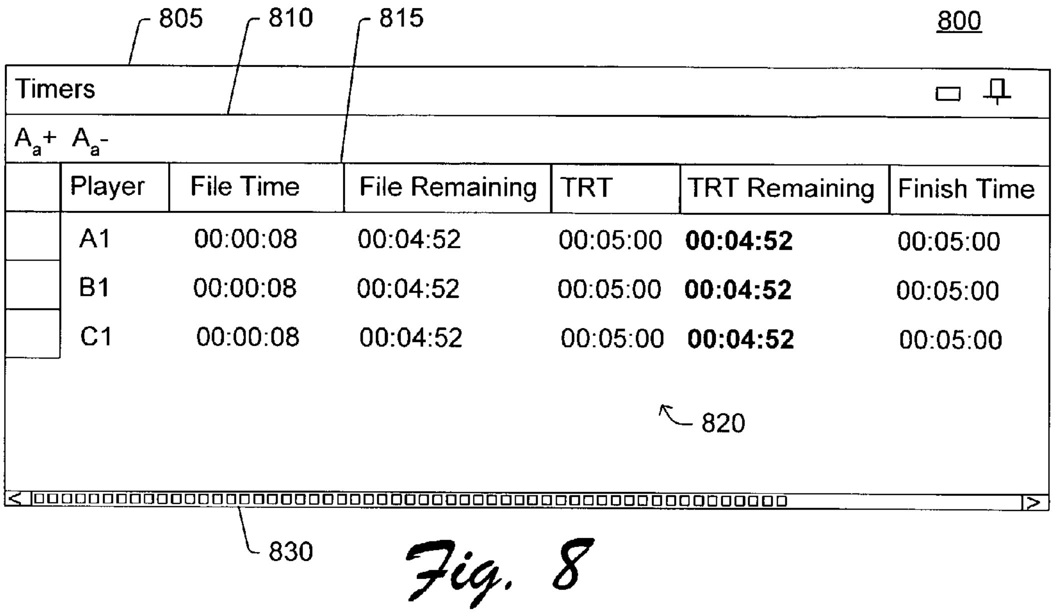

FIG. 8. represents an exemplary user interface configuration for implementation of the Timers dialog box of FIG. 5.

Figure 9:
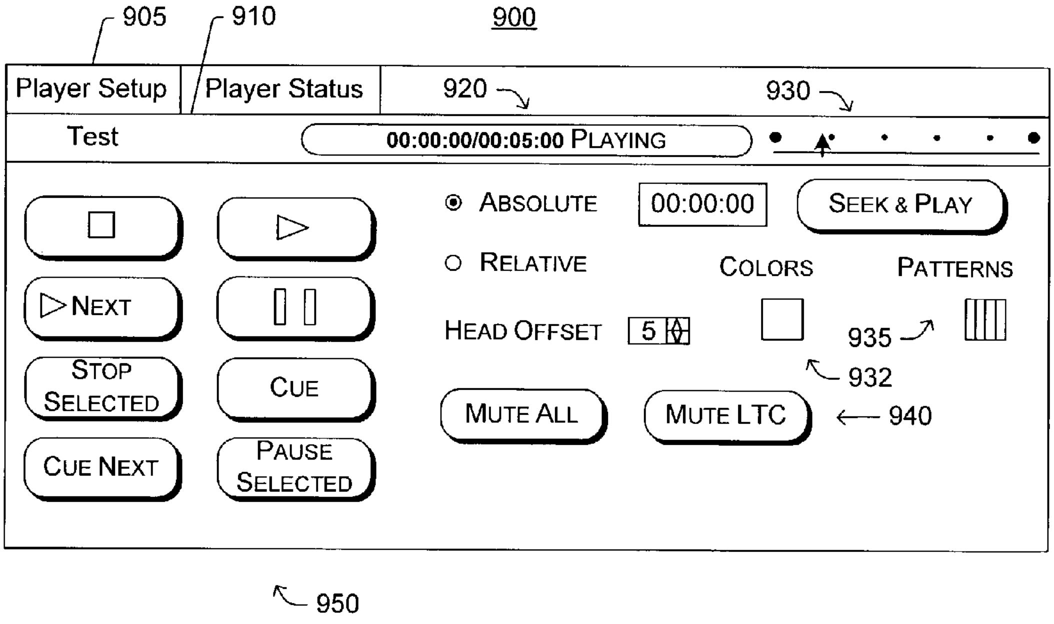

FIG. 9 represents an exemplary user interface configuration for implementation of the Live Playback System dialog box of FIG. 5.

DETAILED DESCRIPTION

The following disclosure describes methods and apparatus for providing synchronized displays from two or more digital data sources. The displays typically include both audio and video content.

Exemplary Display Environment

Prior to describing how an improved display technology synchronizes two or more displays and/or media streams, the following section addresses an environment in which such technology finds utility. The discussion of the environment provides a framework within which various pieces of the improved display synchronization technology can be developed.

Platform Architecture

Figure 1:
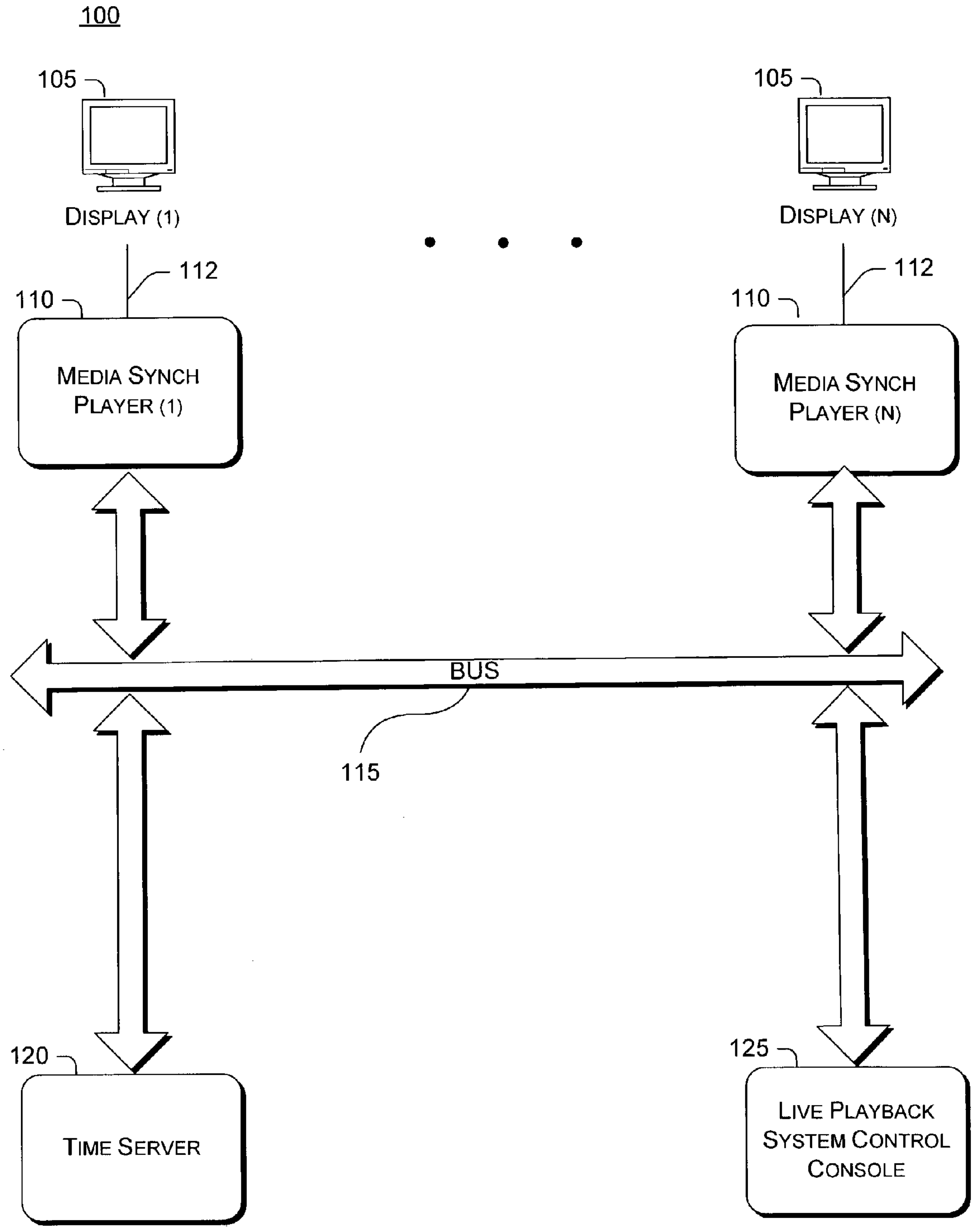
FIG. 1 shows an exemplary environment in which improved display synchronization technology disclosed herein may be employed.

FIG. 1 shows an exemplary environment 100 in which the improved display synchronization and live playback system and methods disclosed herein may be useful. The environment 100 includes a plurality of displays 105, denoted Display(1) through Display (N), with ellipsis indicating that an arbitrary number of such displays 105 may be synchronized. Each display 105 is coupled to a corresponding media synch player 110 via a signal path 112. A bus 115 is coupled to each media synch player 110, a time server 120 and a live playback system control console 125.

It will be appreciated that while the system elements are shown as being coupled together via a bus 115, other types of interconnections are also possible, including fiber optic communications, LANs, WANs or the Internet or any other data network, and that different portions of the interconnections represented by the bus 115 may comprise one or more of such data exchange media. It will be appreciated that the bus 115 may comprise interconnection via internet protocol networks such as IEEE 802.11, 10Base-T and home phone network alliance or HPNA, among others.

In one embodiment, the control console 125 includes a timecode card (not shown) that is slaved to the time server 120. Timecodes from the timecode card transmit a timing signal that may be used to control external devices such as light control boards for controlling ambient lighting in the area(s) where the displays 105 are deployed, backup devices intended to substitute for other system elements in the event of malfunction and the like. In one embodiment, timecodes in accordance with SMPTE standards are employed. In one embodiment, the timecodes are not necessarily Network Time Protocol (NTP) time but the timecodes are synchronized to one another and may be offset from another time demarcation system.

It will be appreciated that additional types of perceptual stimulation devices besides conventional audio-visual displays may be synchronized in the environment or system 100. Such additional types of devices can include other types of audio-visual signal sources, including legacy signal sources, and may also include varied elements, such as special-effects devices (e.g., data ports, flash-bang, smoke devices, mist devices, water fountains or jets with or without modulation capabilities, ambient light modulation capabilities, olfactory stimulation devices and any other type of device capable of modulating a perception or sense, directly or indirectly, or of producing a perceptual result or stimulation).

Computer systems, such as the media synch players 110, or the live playback system control console 125, typically include at least some form of computer readable media. Computer readable media can be any available media that can be accessed by a computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by the computer system. Communication media typically embodies computer readable instructions, data structures, program logic or program modules or other data embodied in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Any of the above or combinations of any of the above should also be included within the scope of computer readable media.

Exemplary Applications

In operation, the media synch players 110 each generate a content stream such as video or audiovisual data in synchrony at the behest of the live playback system control console 125. Synchronism is derived from the time server 120, facilitating orchestration of the content provided by the media synch players 110. The system control console 125 and the media synch players 110 are slaved to the time server 120. As such, the system control console 125 can transmit a start time t+d for the media synch players 110 to start providing content from media files 210 (FIG. 2), and the media synch players 110 are synchronized with respect to this start time.

One exemplary application might be a large meeting where the attendees are so spread out in a common arena that they are not readily able to directly see or hear a speaker who is addressing the meeting. In such a setting, a number of displays 105 might be employed. If, for example, five large, high resolution displays 105 (e.g., 1024×768 pixels) were employed, display(1), display(3) and display(5) might, at one point in time, show a text presentation common to these three displays 105, while display(2) and display(4) might show the speaker who is addressing the meeting and provide the corresponding audio.

In such a case, all five of the displays 105 might feature an audio track providing speech from the speaker, or a subset (such as display(2) and display(4)) might include such audio capabilities. At another stage during the meeting, all five displays 105 might feature the same content. In many such cases, maintaining synchronism between the displays 105 and any audio track is highly desirable in order to present the content in a way that is intelligible and that promotes comprehensibility of the desired content.

Another example of an application is one where one or more of the displays 105 are in different locations, providing content to different audiences at geographically diverse locations. In such an example, the displays 105 may all be providing the same content or some displays 105 may be providing different content than others of the displays 105, but the content is being providing synchronously by the displays 105.

Yet another example of an application for the system 100 might employ plasma panels or other video displays for the displays 105, and the displays 105 may be "tiled" together to provide a single larger effective display area coupled with high resolution. Such might comprise displays 105 tiled together to form a display analogous to an IMAX® movie screen, for example. Such might comprise a group of displays 105 tiled in a horizontal or vertical row or column or both. Displays 105 may be composed or placed in other manners of grouping to provide a desired effect. In such a composite or "tiled" display 105, synchronism between images associated with such displays 105 as well as any soundtrack or other presentation devices contributes to presentation of content without distraction or loss of intelligibility.

Exemplary Media Synch Player

Figure 2:
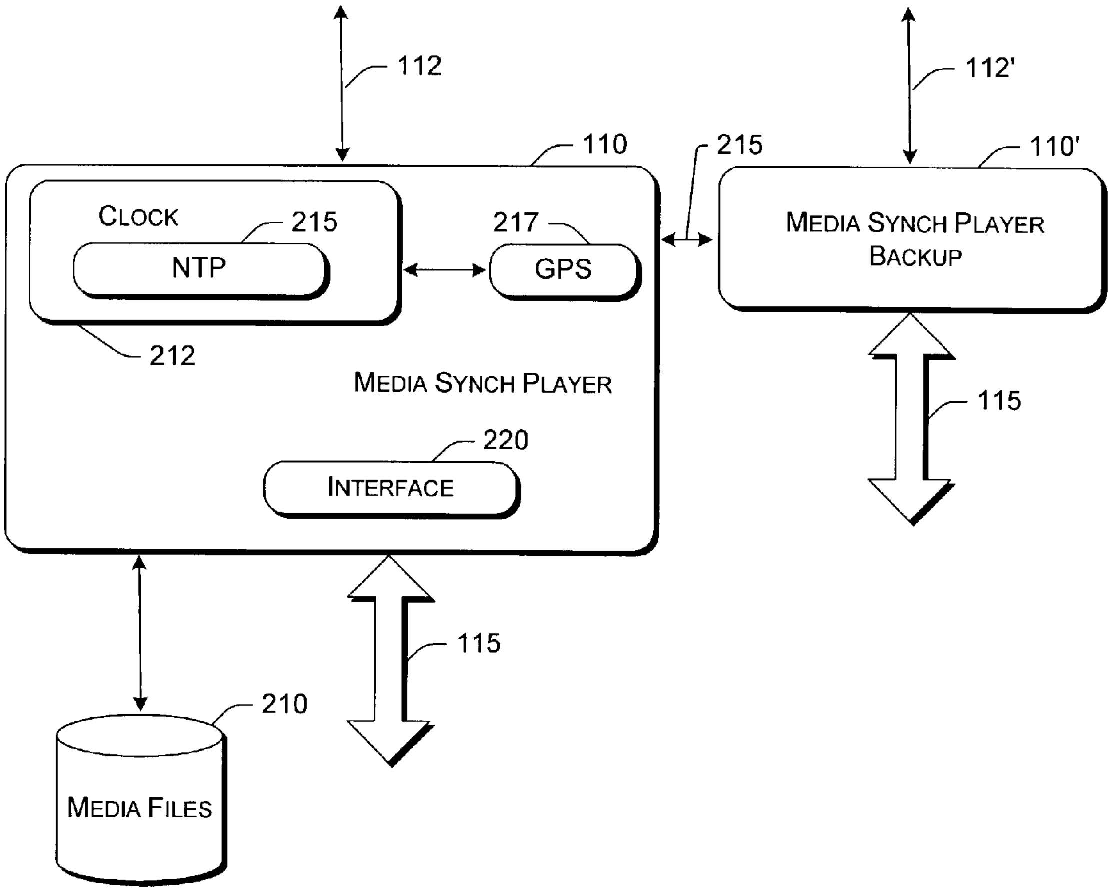
FIG. 2 is a schematic diagram of a media synch player useful in the environment of FIG. 1.

FIG. 2 is a schematic diagram of an exemplary media synch player 110 useful in the environment of FIG. 1. The exemplary media synch player 110 may be realized as a modified conventional personal computer, such as is available from a variety of commercial sources, employing a Windows® operating system, available from many sources and from Microsoft Corporation of Redmond, Wash.

The exemplary media synch player 110 may be realized in a variety of different manners to display video and/or audio content (and/or other content). In one implementation, the exemplary media synch player 110 is implemented using a collection of "filters" referred to as a filter graph, and a filter graph manager. The filter graph manager controls the data structure of the filter graph and the way data moves through the filter graph. How the content is to be displayed can be controlled and changed by interacting with and properly configuring the filters of the filter graph. The filter graph manager provides a set of software objects for communication between a filter graph and one or more applications. According to one implementation, individual filters of a filter graph architecture are implemented as component object model (COM) objects of an operating system executing on a computer, each implementing one or more interfaces which contain a predefined set of functions, called methods. Methods are called by an application program or other component objects in order to communicate with the object exposing the interface. The application program can also call methods or interfaces exposed by the filter graph manager object.

In a particular exemplary implementation, the exemplary media synch player 110 is implemented using filters in accordance with the DirectShow® application programming interface and architecture. Additional information regarding the DirectShow® application programming interface and architecture is available from Microsoft Corporation of Redmond, Wash.

The exemplary media synch player 110 includes media files 210, which may be represented by one or more digital data streams representing video and/or audio content stored on a hard drive, for example. In one embodiment, the media files 210 are Windows Media® player files, that is, digital files representing video and/or audiovisual content in a format that is consistent with the media files being readable by the Windows Media® player series of computer software products developed and distributed by the Microsoft Corporation of Redmond, Wash. MP3 files, WMA (Windows Media Audio) and WMV (Windows Media Video) files are examples of such types of files. In one embodiment, the media files are stored at a shared media storage location, e.g., a media storage location shared by two or more media synch players 110.

The exemplary media synch player 110 also includes a clock module or clocking system 212 having a capability for being slaved to another clocking system. In one embodiment, the clock module 212 comprises a Network Time Protocol module 215. An interface 220 couples the media synch player 110 to the bus 115 and facilitates control of the media synch player 110 by a system operator using the live playback system control console 125 of FIG. 1.

Optionally, time synchrony may be provided via a GPS interface 217 equipped to derive a time signal from the global positioning satellite system. For example, interfaces such as the PC-471 and ES-110 products can provide such time signals and are available from ESE, 142 Sierra Street, El Segundo, Calif. Such can facilitate time coordination between media synch players 110 having relatively wide physical separation between them, however, GPS is but one way to provide a common time standard between media synch players 110 and other system elements such as the time server 120 and the live playback control console 125.

In one embodiment, the media synch player 110 is configured to provide first content and is coupled via a link 215 to a nominally identical backup media synch player 110' that is configured to "shadow" the media synch player 110 until such time as the media synch player 110 malfunctions. When the media synch player 110 malfunctions, the backup media synch player 110' provides a continuation of the first content via an alternate signal path 112'.

The continuation of the first content provided by the alternate signal path 112' is consistent with what the media synch player 110 would have provided but for the malfunction, and is synchronized with the system 100 analogously to the first content from the media synch player 110. In order to be able to provide this backup function, the backup media synch player 110' needs to have access to the media files 210 associated with the media synch player 110, or copies thereof, and also is similarly operating in synchrony with the system 100. The backup media synch player 110' may include a separate data files analogous to those contained in media files 210. In one embodiment, the media synch player and associated backup media synch player 110' are addressed as an entity or group by the control console 125.

Time Synchronization

Figure 3:
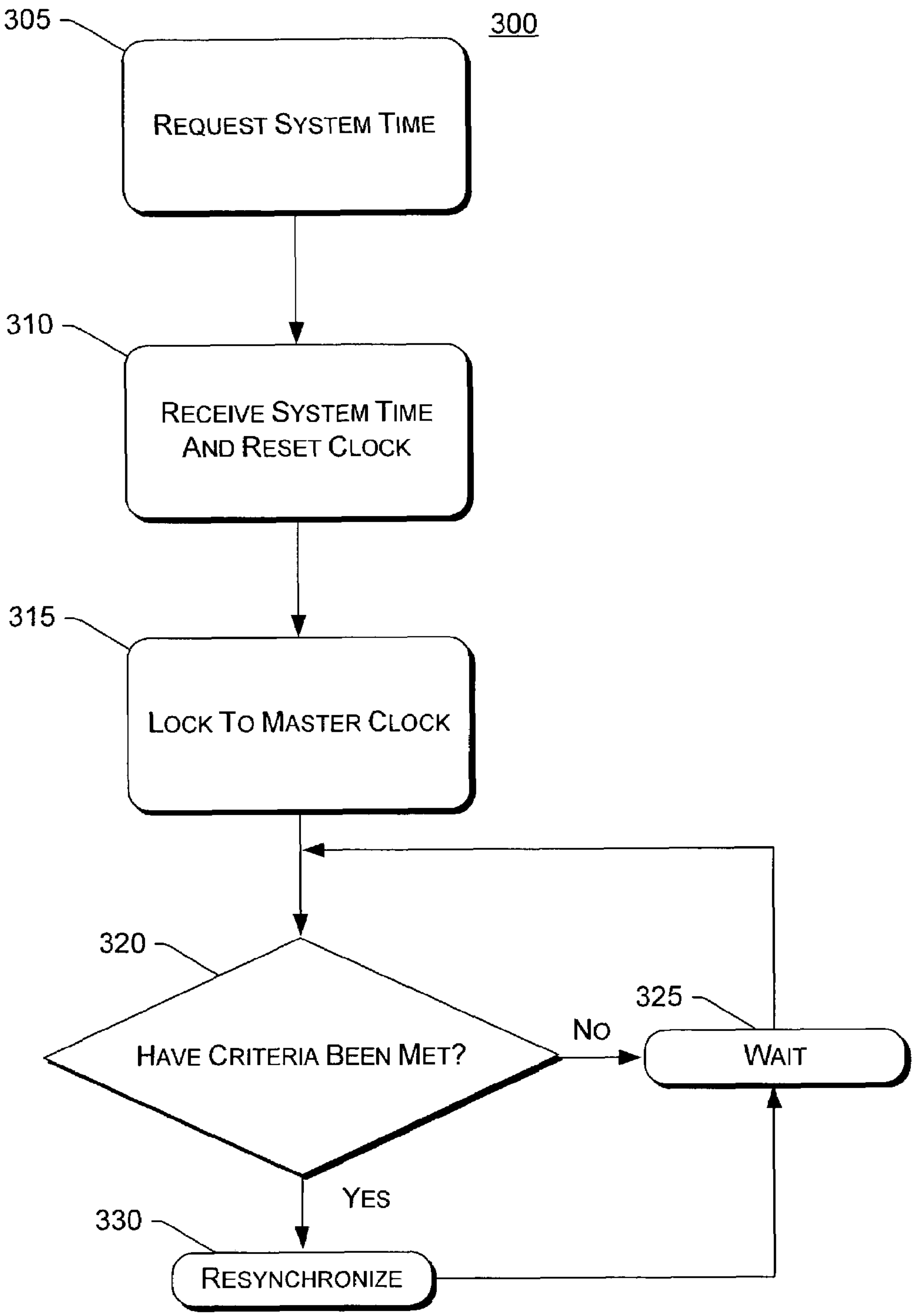
FIG. 3 is a flowchart of an exemplary process for synchronizing the media synch players of FIGS. 1 and 2.

FIG. 3 is a flowchart of an exemplary process 300 for synchronizing the media synch players 110 of FIGS. 1 and 2. The process 300 may be implemented via the access point or interface 220 and the clock 212 or time master device of FIG. 2 in accordance with the disclosure of U.S. patent application Ser. No. 09/836,834, filed on Nov. 27, 2002, entitled "Method And System For Disaggregating Audio/Visual Components", listing T. Blank as the inventor, which application is assigned to the assignee of the present application, the disclosure of which is hereby incorporated herein by reference. The process 330 may also be implemented using the GPS interface 217 described above.

As a general premise, IP networks do not guarantee the timely delivery of any information. A best effort packet delivery is what can be expected. In other words, a packet of data will arrive at a destination when it arrives, if it arrives. This uncertainty of IP networks is attributable to delays, latency, jitters and other inherent network characteristics. The present disclosure describes solutions enabling A/V streams to be coordinated in a synchronized manner despite the characteristics of typical IP networks. In particular, the present disclosure relates to 'tight time' synchronization for the coordination of multiple sources of A/V content.

A/V coordination is achieved by establishing a time synchronization between multiple devices (e.g., media synch players 110 as well as the time server 120 and the control console 125). Time synchronization is attained by employing the time server 120 as a time master for the system 100. All of the elements synchronize their internal clocks to the time server. In operation, a time stamp "t" is obtained by each device from the controller 125, which is synchronized with the time server 120. Also included with the time stamp t is a delay indication "d". In combination, these time related components instruct the media synch players 110 on when to render content available from the media files 210. Essentially, each media synch player 110 will wait to render content until a particular time t+d, derived from the time stamp from the controller 125. As such, content from all of the media synch players 110 will be synchronized to the same moment in time—t+d—regardless of when the time synchronization was initiated.

Time information is also present in the individual clocks of the media synch players 110. This time information may be transmitted in a non-isosynchronous manner back to the time server 120 and combined with time information derived from the time server to speed up or slow down rendering of the clocks 212 in the individual media synch players 110. A more detailed description of the use of common time to convert a non-isosynchronous network to an isosynchronous network can be found in U.S. patent application Ser. No. 09/863,834, filed on Apr. 17, 2001 (Published Application No. 20020150053 A1, published on Oct. 17, 2002), entitled "Methods And Systems For Distributing Multimedia Data Over Heterogeneous Networks", listing Donald M. Gray et al. as inventor(s), which is assigned to the assignee of the present application and which is hereby incorporated herein by reference.

The process 300 begins in a block 305. In the block 305, the clock module 215 in each of the media synch players 110 transmits a signal to request a time from the time server 120. In one embodiment, the clock modules 212 comprise NTP modules 215.

In a block 310, the time server 120 provides common time signals to the media synch players 110 and the associated clock modules 215 to cause a reset to a predetermined time, such as 12:00.

In a block 315, the clock modules 215 acquire lock with a clock contained in the time server 120. In one embodiment, the clock modules 215 acquire phase lock with the clock contained in the time server 120. In one embodiment, the clock modules 215 acquire frequency lock with the clock contained in the time server 120.

In a query task 320, a determination is made that one or more predetermined criteria for resynchronization have been met. In one embodiment, resynchronization takes place at small intervals, such as every few minutes. In one embodiment, such is performed in accordance with the network time protocol.

When the query task 320 does not determine that the predetermined criteria have been met, the process 300 may wait a predetermined time, as indicated by block 325. Control then passes back to the query task 320.

When the query task 320 determines that the predetermined criteria have been met, the clock modules 120 are resynchronized with the time server 120 in a block 330. Control then passes back to the block 325. The process 300 continues until such time as system operation is terminated.

Media Synch Player Operation Control

Figure 4:
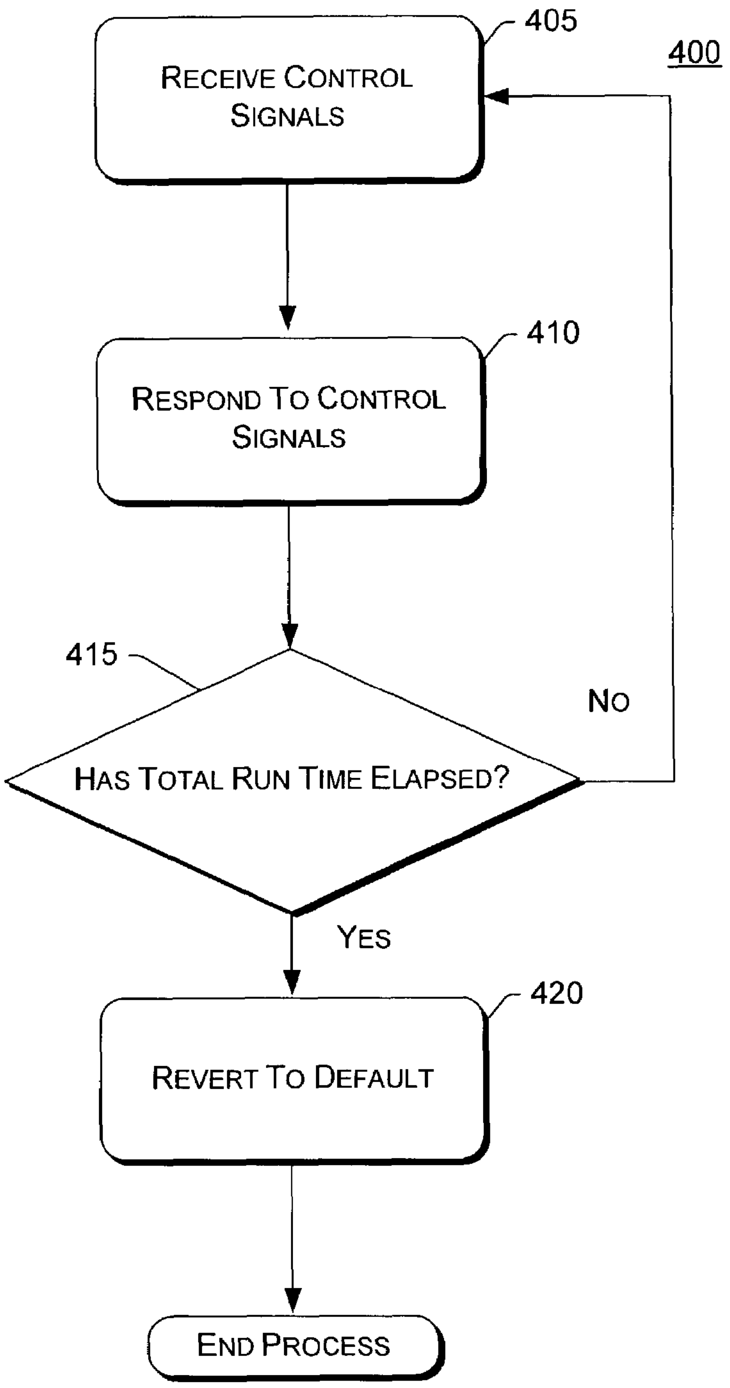
FIG. 4 is a flowchart of an exemplary process for coordinating the media synch players of FIGS. 1 and 2 with the control console via the interface and bus.

FIG. 4 is a flowchart of an exemplary process 400 for coordinating the media synch players 110 of FIGS. 1 and 2 with the control console 125 via the interface 220 and bus 115. The process 400 begins in a block 405.

In the block 405, the control console 120 assembles a list of commands from a playlist or eventlist or responds to operator commands to deviate therefrom. The playlist provides instructions for coordination of each of the media synch players 110 in providing content (e.g., windows media files, images, patterns, colors, or animations) in a predetermined sequence.

In the block 405, control signals from the control console 125 are received by the interface 220. In one embodiment, the control signals may comprise, for example, one of: play, pause, stop, seek to time, get file and show images.

For example, the seek to time command may cause one or more of the media synch players 110 to discontinuously switch to another portion of the media files 210. The seek to time command is capable of providing a stopping and restarting function analogous to a rewind or fast forward function but without engendering the delay associated with movement of conventional physical recording media, and is also capable of locating corresponding portions of two or more media files 210 with greater precision than is typical of conventional media or systems. In other words, synchronized restarting begins at a first point in the first digital media file corresponding to a second point in the second digital media file, and vice versa.

In a block 410, the media synch players 110 respond to the control signals and provide appropriate output signals via the signal paths 112 to the displays 105. Such may comprise start of synchronized operation of the media synch players 110 and associated displays 105, switching from one media file 210 to another (e.g., get file followed by start), cease operation (e.g., stop), which may include initiation of a predetermined state such as a blank or black display 105, and the like.

In a query task 415, the process 400 determines when a total run time has elapsed. When the query task 415 determines that the total run time of a media file 210 or playlist of multiple media files 210 has elapsed, control passes to a block 420. When the query task 415 determines that the total run time has not yet elapsed, control passes back to block 405.

In the block 420, the media synch players 110 cause the displays 105 to revert to a predetermined default state at a conclusion of the media file 210 or playlist, or in response to user input via control console 125. Such a default state may be a black or blank display 105, or may be a display of a chosen image or video loop. The process 400 then ends.

As a result of the processes 300 and 400, the media synch players 110 and associated displays 105 provide coordinated and synchronized sequences of images or video and/or audio in frame-by-frame synchronization. The synchronization may be maintained during display of content from specific media files 210 and may be maintained when such media files 210 or a selection of a portion thereof is changed, facilitating rehearsal of specific portions of a presentation and also enabling graceful deviation from a predetermined playlist in response to circumstances.

Exemplary Graphical User Interface

FIG. 5 represents an exemplary graphical user interface 500 associated with the control console 125 of FIG. 1, while FIGS. 6-9 represent exemplary portions of the graphical user interface of FIG. 5 in more detail. It will be appreciated that a user may interact with the graphical user interface 500 via any tactile input device, including a keyboard, mouse, touchscreen or any other form of user communication.

The exemplary graphical user interface 500 includes a live playback system toolbar 505 that includes identification information together with conventional execution management function buttons. A menu bar 510 provides a dialog box 512 for accessing eventlists, and includes playlist or media file 210 identification information (e.g., "Test_4") together with conventional file management tool buttons 515.

An identification bar 520 provides identification information relative to a display bar 525. The identification information corresponds to data displayed below the corresponding information in the display bar 525. The identification information shown in the identification bar 520 may include ID or identification corresponding to a particular media event player 110 of FIGS. 1 and 2, an Event Name corresponding to a selected media file 210 or playlist, an indicator "Loop" showing whether a Loop function has been selected (e.g., this may be used to select repeated looping through a selected media file and to indicate a number of loops selected), a Duration corresponding to a time length for presentation of the selected media file 210, and a LTC (Longitudinal Time-Code) offset for setting the Hours counter on a conventional SMPTE timecode signal generator. Such timecode signal generators are widely available, and the signals from such timecode generators may be employed to synchronize media players 110 with legacy presentation equipment, such as existing light boards and other devices.

The interface 500 also includes a dialog box 530 corresponding to Event Details, a dialog box 535 corresponding to PlayerSetup, a dialog box 540 corresponding to Timers associated with the Event Details and PlayerSetup, and a Live Playback System dialog box 545 for controlling the media synch playback system of FIG. 1. These dialog boxes 530, 535, 540 and 545 are described below in more detail with reference to FIGS. 6, 7, 8 and 9, respectively.

Figure 6:
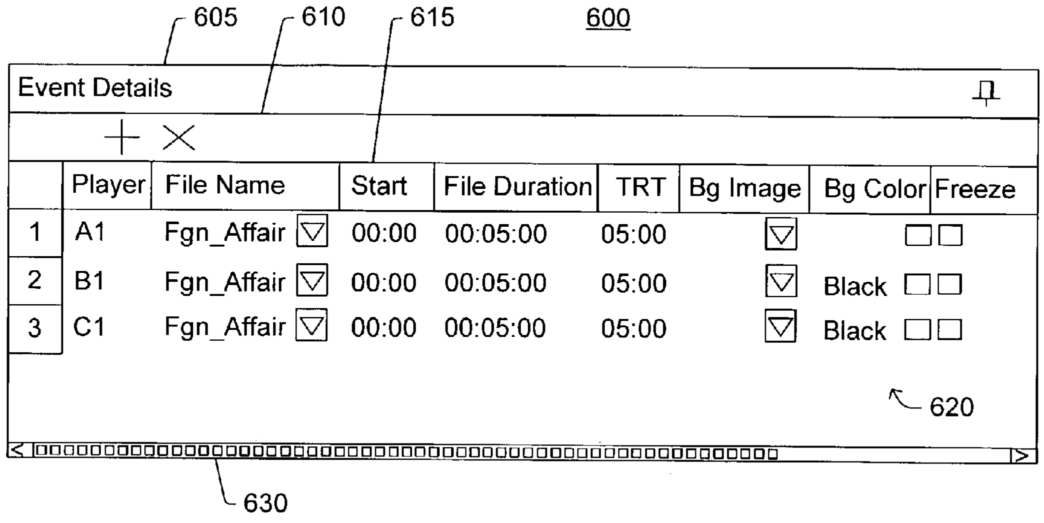
FIG. 6 represents an exemplary user interface configuration for implementation of the Event Details dialog box of FIG. 5.

FIG. 6 represents an exemplary user interface configuration 600 for implementation of the Event Details dialog box 530 of FIG. 5. The exemplary user interface 600 of FIG. 6 includes a display bar 605 providing identification information, a menu bar 610 including controls for conventional execution management functions and an identification bar 615 providing labels for data displayed therebelow in an area 620.

In the example of FIG. 6, the identification bar 615 includes labels ("Player") for each media synch player 110 (FIGS. 1 and 2), a file name corresponding to a media file 210 (FIG. 2) for each media synch player 110 and a start time relative to the event start time described above with reference to block 310 of FIG. 3. The exemplary identification bar 615 also shows a file duration time for the selected media file 210, a total run time ("TRT") for the playlist, a label Bg Image corresponding to selection tools in the area 620 therebelow for selecting a background image for each media synch player 110 and display 105, a label Bg Color corresponding to selection tools in the area 620 therebelow for selecting a background color for each media synch player 110 and display 105 and a Freeze label corresponding to control tools in the area 620 therebelow for freezing a given image associated with a given media synch player 110 and corresponding display 105. A slider bar 630 allows user selection of various portions of the user interface 600 for display and/or modification.

Figure 7:
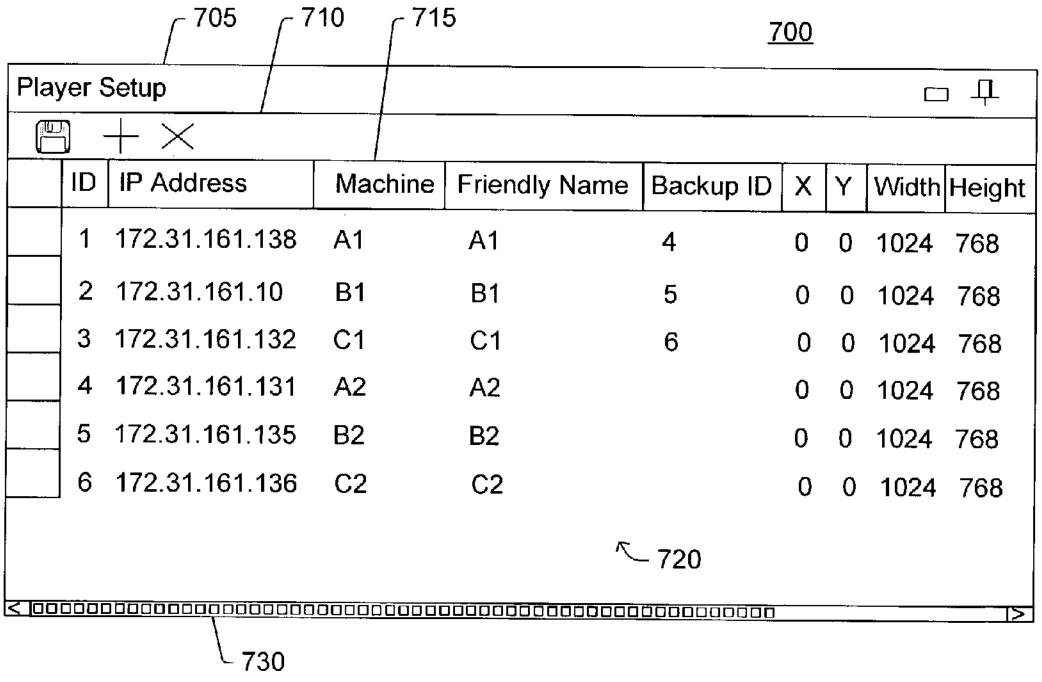
FIG. 7 represents an exemplary user interface configuration for implementation of the Player Setup dialog box of FIG. 5.

FIG. 7 represents an exemplary user interface configuration 700 for implementation of the Player Setup dialog box 535 of FIG. 5. The exemplary user interface 700 of FIG. 7 includes a display bar 705 providing identification information, a menu bar 710 including controls for conventional execution management functions and an identification bar 715 providing labels for data displayed therebelow in an area 720.

The identification bar 715 shows labels for a label for a particular media synch player 110 (FIGS. 1 and 2, "ID"), an internet protocol or IP address for the media synch players 110 ("IP Address"), an identification of the media synch players ("Machine"), a colloquial name for each of the media synch players 110 ("Friendly Name"), identification of a backup for each media synch player 110 when such is deployed ("Backup ID"), and X, Y, width and height data for the display 105 associated with each of the media synch players 110 ("X", "Y", "Width" and "Height", respectively). A slider bar 730 allows user selection of various portions of the user interface 700 for display and/or modification.

FIG. 8. represents an exemplary user interface configuration 800 for implementation of the Timers dialog box 540 of FIG. 5. The exemplary user interface 800 of FIG. 8 includes a display bar 805 providing identification information, a menu bar 810 including controls for conventional execution management functions and an identification bar 815 providing labels for data displayed therebelow in an area 820. The Aa+ and Aa− function buttons facilitate user interface font size adjustments for lettering in the display of FIG. 8.

The identification bar 815 shows labels for a media synch player 110 (FIGS. 1 and 2, "Player"), an elapsed time since the start of playing a media file 210 (FIG. 2, "File Time"), an amount of time to play a remainder of the media file 210 ("File Remaining"), a total run time for the media sync player 110 ("TRT"), a total run time remaining for the media sync player 110 ("TRT Remaining"), and a projected finish time for the media sync player 110 ("Finish Time"). The corresponding media synch player 110 and the data associated with that media synch player 110 are displayed as individual rows in the area 820 below the identification bar 815. A slider bar 830 allows user selection of various portions of the user interface 800 for display and/or modification.

FIG. 9 represents an exemplary user interface configuration 900 for implementation of the Live Playback System dialog box 545 of FIG. 5. The exemplary user interface 900 of FIG. 9 includes a menu bar 905 providing controls for switching between a player setup mode and a player status mode and an identification and menu bar 910. The identification and menu bar 910 provides an indication of a selected playlist (e.g., "Test") and includes a display area 920 and a slider control 930. The interface configuration 900 also includes control areas 932 and 935 for selection and display of colors and patterns for a media synch player 110, respectively, mute control function buttons 940 and player control function buttons 950. The Mute LTC function button provides a safety feature and allows an operator to disable devices such as flash pots and thus avoid accidental triggering of such devices or false firing during rehearsals when an operator replays or switches to specific portions of a presentation The display area 920 provides an indication of a start time (e.g., 00:00:00), a duration (e.g., 00:05:00), a status (e.g., "playing"), selection and indication functions for absolute vs. relative time together with an elapsed time display, and status and control functions relative to head offset (a delay at startup that is common to all of the media synch players 110).

The slider control 930 facilitates stopping play of the media and restarting at another point in the media file selected via user manipulation of the slider pointer. The player control function buttons 950 allow a user to select conventional playback functions, such as play, forward, next file, cue, cue next and pause.

Exemplary Rules

The following set of exemplary rules provide a framework within which the aspects disclosed with respect to the preceding discussion may be implemented.

Rules:

Each EventList or Playlist may contain an unlimited number of Events.

Each Event has an EventName and an EventDuration. An EventDuration is calculated as the maximum of (FileDuration+StartTime).

A Player (media synch player 110) is a definable name given to a specific PlayerApplication 110 as defined by PC IP address. In one embodiment, a Player 110 can have only one backup/mirror Player 110.

Any combination of Players 110 can participate in an Event. Participating Players 110 may be called EventPlayers 110. The EventTime is the current time on the Event timeline within the EventDuration of a currently playing Event.

During an Event, an EventPlayer 110 can:

(i) Playback a Windows Media Video (WMV) file 210 stored on the Player 110.

(ii) Display an Image stored on the Player 110.

(iii) Display a Color. In one embodiment, when so selected, Color defaults to Black for all EventPlayers 110.

(iv) A combination of the above options such that a 0 or 1 WMV file 210 is played, and 0 or 1 Colors are displayed and 0 or 1 Images are displayed. The WMV file 210 may be preceded or followed by either a Color or an Image. For each EventPlayer 110, Color and Image are mutually exclusive, only one is allowable at any one time. A WMV file 210 is not necessarily required for display of Image or Color.

An Event can be set to Loop, causing the entire Event sequence (including any Color, Image and WMV file 210) to Loop on all EventPlayers 110. The Loop will take place as defined within the EventPlayer at EventTime=StartTime+TRT.

Each EventPlayer 110 can be configured to Start at a user-defined Start Time during the Event. Start Time must be >=0. Start Time defaults to 00:00:00 for all EventPlayers 110. Start Time only applies to WMV file 210 playback. In this case, any Color or Image specified for this EventPlayer 110 will be displayed for the duration of the Event before Start Time.

Each EventPlayer 110 can be configured with a user defined Total Running Time (TRT). TRT only applies to WMV file 210 playback. TRT must be >=0 and <=duration of the WMV file 210. TRT defaults to FileDuration for all EventPlayers 110 playing back a WMV file 210. The default TRT for an EventPlayer 110 equals the WMV FileDuration. In this case any Color or Image specified for this EventPlayer 110 will be displayed for the duration of the Event after EventTime=StartTime+TRT. This makes it possible to define a time at which the Color or Image appears. When Freeze is selected, the Color or Image does not appear.

An EventPlayer 110 can be configured to Freeze during WMV file 210 playback. If this option is selected, the EventPlayer 110 will Freeze at the specified TRT. Observed behavior on Freeze will be identical to a Pause for the EventPlayer 110 at EventTime=StartTime+TRT, with the exception that, unlike in Pause mode, playback of the current Event cannot be resumed for that EventPlayer 110. When the Freeze option is selected, any Color or Image specified for this EventPlayer 110 will not be displayed for the duration of the Event after TRT. Rather, the video frame displayed by the EventPlayer 110 at EventTime=StartTime+TRT will be preserved on the screen for the duration of the Event after TRT. The Color or Image will be displayed for the EventTime<StartTime.

Freeze and Loop are mutually exclusive. In one embodiment, when an Event is set to Loop, the Freeze option cannot be selected for any EventPlayer (e.g., media synch player 110 of FIGS. 1 and 2) during that Event.

Clear implies forcing a Player 110 to display Black Color. A Player 110 can be Cleared only when it is not currently playing back a WMV file 210. Clear is not persistent, e.g., when a Player 110 is Cleared and then a Seek operation is performed on the Event such that the Player 110 that was previously cleared will display the configured content at the new EventTime.

Zero or more Events may be in progress at any given time. In one embodiment, when an Event is started, all the EventPlayers 110 participating in that Event are first Stopped and then the selected Event is played. Event playback commences after the Head Offset specified by the operator (FIG. 9). Head Offset is common to all EventPlayers 110 and is used to ensure sync between EventPlayers 110.

EventLists can be activated at any time with use of a file browse window or a Favorites List. Only one EventList is active at any given time.

In one embodiment, Players 110 may be selectively or collectively Paused, Stopped, Muted or un-Muted.

A Seek operation may be performed on any currently cued or playing Event. Seek may be Relative to current EventTime or Absolute to a specified EventTime. To Seek an Event that is not currently cued or playing, the operator must first Cue or Play the Event, followed by a Seek operation. It is imperative to note that Seek operations are performed on the Event timeline and apply to all EventPlayers 110 in the selected Event. In one embodiment, EventPlayers 110 cannot be independently Seeked.

CONCLUSION

By now it will be appreciated that methods and apparatus for provision of synchronized image display have been described that result in certain advantages relative to prior art display technologies.

Additionally, such avoids investment in large amounts of hardware to try to increase the reliability of conventional media systems via provision of redundant elements of very expensive hardware for backup capability. The disclosed media content provision processes also sidestep waiting periods while physical data or media storage media are advanced or rewound in order to deviate from the script or playlist corresponding to the content of the media.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A process for synchronizing multiple media players being executed on one or more computers, each media player configured to provide at least audio and video content from digital media files, the process comprising:

requesting a system time from a time server associated with the multiple media players;

receiving a system time from the time server;

locking a clock in each of the multiple media players to a time from a master clock in the time server using the system time;

providing content from each of the multiple media players, the content from each of the multiple media players is synchronized with content from the other multiple media players, wherein:

the synchronized content comprises synchronizing content for the multiple media players such that selected content for a first media player is not the same as selected content for a second media player; and the synchronizing is performed by an administrator using a central control console to control the multiple media players; and evaluating a query task against a predetermined criteria, the evaluating comprising:

in an event the predetermined criteria are met, resynchronizing the clocks in the multiple media players; and in an event the predetermined criteria are not met, waiting for a predetermined time until evaluating another query task, wherein:

providing content comprises providing content from each of the multiple media players in response to commands from the central control console at a time specified by the central control console, the commands being assembled from a playlist and providing instruction for coordination of each of the multiple media players in providing content in a predetermined sequence; and the central control console includes a graphical user interface (GUI) enabling the administrator to selectively choose separate content and separate control options for the first and second media players and further enabling the administrator to modify the playback of at least one of the first and second media players such that modified playback of at least one of the first and second media players deviates from the playlist, the GUI comprising:

an event details dialog box comprising:

a label identifying each of the multiple media players;

a file name corresponding to a media file for each of the multiple media players; and selection tools for selecting particular display options for each of the multiple media players;

a player setup dialog box corresponding to the setup of each of the multiple media players, the player setup dialog box comprising:

an internet protocol address for each of the multiple media players; and an identification of a backup media player for each of the multiple media players;

a timers dialog box corresponding to timing associated with event details and the setup of each of the multiple media players; and a live playback system dialog box controlling each of the multiple media players comprising a slider control pointer facilitating user manipulation of a playback position of the media file for a particular media player.

2. The process of claim 1, wherein locking a clock in each of the multiple media players comprises phase locking to the master clock.

3. The process of claim 1, wherein locking a clock in each of the multiple media players comprises frequency locking to the master clock.

4. The process of claim 1, wherein locking a clock in each of the multiple media players comprises maintaining time synchrony to within predetermined limits.

5. The process of claim 1, wherein providing content comprises providing content from Windows Media data.

6. The process of claim 1, wherein providing content comprises providing content from first Windows Media data for at least the first media player and providing content from second Windows Media data similar to, or different than, the first Windows Media data for at least the second media player.

7. The process of claim 1, wherein providing content comprises providing content from first digital data for at the first media player and providing content from second digital data similar to, or different than, the first digital data for at least the second media player.

8. The process of claim 1, wherein providing content comprises providing content from media files stored on a hard drive.

9. The process of claim 1, wherein providing content comprises providing a video data stream and an audio data stream from at least one of the multiple media players.

10. The process of claim 1, wherein the predetermined criteria is a set amount of time.

11. The process of claim 1, wherein the multiple media players each include an associated display, and the displays associated with the multiple media players are tiled together to provide a single larger effective display.

12. One or more computer-readable storage media storing computer-executable instructions configuring a computer to perform the process of claim 1.

13. A process for orchestrating a playlist of at least first and second digital media files for synchronized play by respective first and second media players being executed on one or more computers comprising:

synchronizing first and second clocks associated with the first and second media players, respectively, with a master clock associated with a time server;

initiating first playback of the first digital media file by the first media player;

initiating second playback of the second digital media file by the second media player, wherein initiating the first and second playback of the first and second digital media files is performed by a central control console that allows a user to synchronize the first and second media players, the first and second media players not displaying same graphic content; and evaluating a query task against a predetermined criteria, the evaluating comprising:

in an event the predetermined criteria are met, resynchronizing the clocks in the first and second media players; and in an event the predetermined criteria are not met, waiting for a predetermined time until evaluating another query task, wherein:

initiating the first and second playback comprises providing content from each of the first and second media players in response to commands from a central control console at a time specified by the central control console, the commands being assembled from the playlist and providing instruction for coordination of each of the first and second media players in providing the content in a predetermined sequence; and the central control console includes a graphical user interface (GUI) enabling the administrator to selectively choose separate content and separate control options for the first and second media players and further enabling the administrator to modify the playback of at least one of the first and second media players such that modified playback of at least one of the first and second media players deviates from the playlist the GUI comprising:

an event details dialog box comprising:

a label identifying each of the first and second media players;

a file name corresponding to a media file for each of the first and second media players; and selection tools for selecting particular display options for each of the first and second media players;

a player setup dialog box corresponding to the setup of each of the first and second media players, the player setup dialog box comprising:

an internet protocol address for each of the first and second media players; and an identification of a backup media player for each of the first and second media players;

a timers dialog box corresponding to timing associated with event details and the setup of each of the first and second media players; and a live playback system dialog box controlling each of the first and second media players comprising a slider control pointer facilitating user manipulation of a playback position of the media file for a particular media player.

14. The process of claim 13, further comprising:

stopping, in response to a command from the central control console, the first and second playback; and restarting the first and second playback at a different point in the first and second digital media files in response to another command from the central control console, wherein the restarting begins at a first point in the first digital media file corresponding to a second point in the second digital media file, and vice versa.

15. The process of claim 13, wherein the first and second digital media files comprise Windows Media files.

16. The process of claim 13, further comprising synchronizing first and second backup media players with the first and second media players.

17. The process of claim 13, further comprising switching from the first media player to a first backup media player in response to a command from the central control console.

18. The process of claim 13, wherein synchronizing comprises synchronizing first and second clocks associated with the respective first and second media players, where the first media player is in a first geographical region and the second media player is in a second geographical region.

19. The process of claim 13, wherein synchronizing comprises synchronizing first and second clocks associated with the respective first and second media players, where the first and second media players are configured to provide content to respective first and second displays located at different points in a common arena.

20. The process of claim 13, wherein synchronizing includes establishing at least one of a phase lock or a frequency lock between the first and second clocks and the master clock.

21. The process of claim 13, wherein the predetermined criteria is a set amount of time.

22. One or more computer-readable storage media storing computer-executable instructions configuring a computer to perform the process of claim 13.

23. A system comprising:

a first media synch player having a first time control module configured to be slaved to an external time server, the first media synch player including first media files, the first media synch player being configured to provide first content from the first media files in response to user selected playlist commands from a live playback system controller;

a second media synch player having a second time control module configured to be slaved to the external time server and to maintain synchrony with the first time control module, the second media synch player including second media files analogous to the first media files, the second media synch player being configured to provide second content from the second media files in response to the user selected playlist commands from the live playback system controller, wherein the first and second content are not the same content; and a graphical user interface (GUI) enabling an administrator to selectively choose separate content and separate control options for the first and second media synch players and further enabling the administrator to modify the playback of at least one of the first and second media synch players such that modified playback of at least one of the first and second media players deviates from the playlist, the GUI comprising:

an event details dialog box comprising:

a label identifying each of the first and second media synch players;

a file name corresponding to the first and second media files for each of the first and second media synch players; and selection tools for selecting particular display options for each of the first and second media synch players;

a player setup dialog box corresponding to the setup of each of the first and second media synch players, the player setup dialog box comprising:

an internet protocol address for each of the first and second media synch players; and an identification of a backup media player for each of the first and second media synch players;

a timers dialog box corresponding to timing associated with event details and the setup of each of the first and second media synch players; and a live playback system dialog box controlling each of the first and second media synch players comprising a slider control pointer facilitating user manipulation of a playback position of the media file for a particular media synch player;

wherein:

the first and second media synch players each include a respective one of first and second hard drives, and the first and second media files comprise computer data stored on each of the respective hard drives or a shared media storage location; and both the first and second time control modules are configured to:

request a system time from the external time server;

reset their respective time control modules in accordance with the system time;

lock to a master clock contained in the external time server; and send a query task, and in response to sending the query task:

resynchronize the first and second time control modules in an event a predetermined criteria is reached; and wait for a predetermined time and then issue another query task in an event the predetermined criteria is not reached.

24. The system of claim 23, wherein the first and second media synch players comprise processors configured to execute windows media software to provide content from first and second media files comprising windows media.

25. The system of claim 23, wherein the first and second time control modules are configured to be synchronized by signals in an NIP, GPS, SMPTE or other agreed upon time format.

26. The system of claim 23, wherein the first and second media files comprise windows media data stored on the respective hard drives.

27. The system of claim 23, wherein the predetermined criteria is a set amount of time.

28. One or more computer readable storage media storing a plurality of computer instructions that, when executed by one or more processors, causes the one or more processors to perform acts comprising:

synchronizing a clock in a first media player with an external clock;

providing first audiovisual content from a digital data storage device associated with the one or more processors, or a shared media storage location, in synchrony with second audiovisual content from a second media player, wherein the first and second audiovisual content are:

manually selected by an administrator using a central control console; and not the same content; and evaluating a query task against a predetermined criteria, and in response to the evaluating, further causing the one or more processors to perform acts comprising:

resynchronizing the first and second media players in an event the predetermined criteria is reached; and waiting for a predetermined time until evaluating another query task in an event the predetermined criteria is not reached, wherein:

providing the first audiovisual content in synchrony with the second audiovisual content comprises providing content from each of the first and second media players in response to commands from the central control console at a time specified by the central control console, the commands being assembled from a playlist and providing instruction for coordination of each of the first and second media players in providing the content in a predetermined sequence; and the central control console includes a graphical user interface (GUI) enabling the administrator to selectively choose separate content and separate control options for the first and second media players and further enabling the administrator to modify the playback of at least one of the first and second media players such that modified playback of at least one of the first and second media players deviates from the playlist, the GUI comprising:

an event details dialog box comprising:

a label identifying each of the first and second media players;

a file name corresponding to a media file for each of the first and second media players; and selection tools for selecting particular display options for each of the first and second media players;

a player setup dialog box corresponding to the setup of each of the first and second media players, the player setup dialog box comprising:

an internet protocol address for each of the first and second media players; and an identification of a backup media player for each of the first and second media players;

a timers dialog box corresponding to timing associated with event details and the setup of each of the first and second media players; and a live playback system dialog box controlling each of the first and second media players comprising a slider control pointer facilitating user manipulation of a playback position of the media file for a particular media player.

29. The computer readable storage media of claim 28, wherein the plurality of instructions to cause one or more processors to synchronize a clock comprises instructions to cause the one or more processors to perform acts comprising:

requesting a system time from a global positioning system time source;

resetting the clock in accordance with the system time;

locking the clock to a master clock contained in an external device; and resynchronizing the clock in response to predetermined criteria being met.

30. The computer readable storage media of claim 28, wherein the plurality of instructions to cause one or more processors to synchronize a clock comprises instructions to cause the one or more processors to perform acts comprising:

requesting a system time from a time server;

resetting the clock in accordance with the system time;

locking the clock to a master clock contained in the time server; and resynchronizing the clock in response to predetermined criteria being met.

31. The computer readable storage media of claim 28, wherein the predetermined criteria is a set amount of time.

* * * * *

UNITED STATES PATENT AND TRADEMARK OFFICE

CERTIFICATE OF CORRECTION

PATENT NO. : 7,627,808 B2
APPLICATION NO. : 10/461222
DATED : December 1, 2009
INVENTOR(S) : William Thomas Blank et al.

It is certified that error appears in the above-identified patent and that said Letters Patent is hereby corrected as shown below:

In column 14, line 12, in Claim 7, delete “at” and insert -- at least --, therefor.

In column 17, line 13, in Claim 25, delete “NIP,” and insert -- NTP, --, therefor.

Signed and Sealed this
Twenty-fifth Day of January, 2011

David J. Kappos

David J. Kappos
*Director of the United States Patent and Trademark Office*